June 30, 1925.
B. D. THOMAS
ENGINE MOUNTING FOR AIRPLANES
Original Filed March 8, 1923
1,544,358
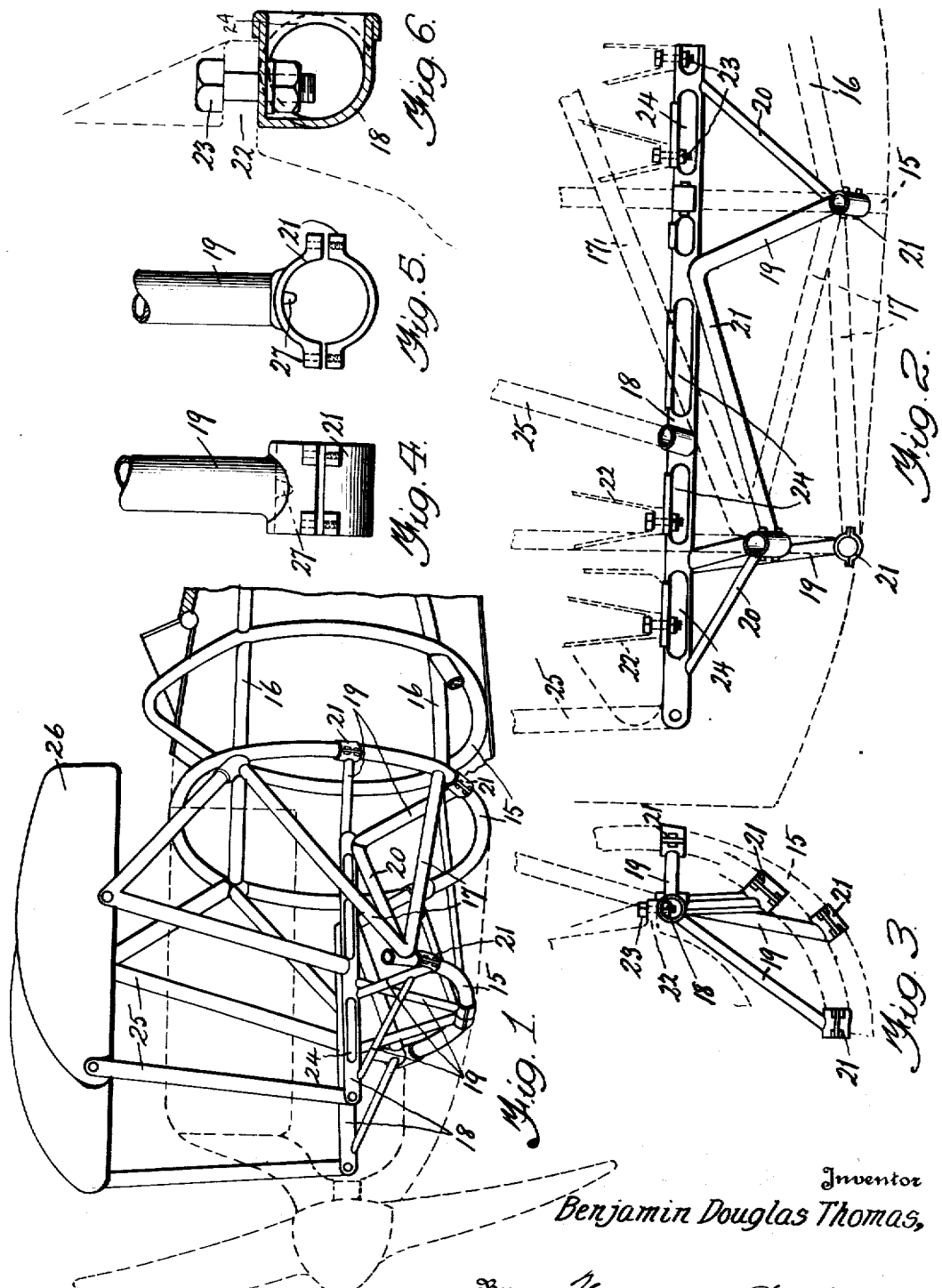

Patented June 30, 1925.

1,544,358

UNITED STATES PATENT OFFICE.

BENJAMIN DOUGLAS THOMAS, OF ITHACA, NEW YORK, ASSIGNOR OF ONE-HALF TO THOMAS-MORSE AIRCRAFT CORPORATION, OF ITHACA, NEW YORK, A CORPORATION OF NEW YORK.

ENGINE MOUNTING FOR AIRPLANES.

Original application filed March 8, 1923, Serial No. 623,612. Divided and this application filed September 19, 1924. Serial No. 738,610.

*To all whom it may concern:*

Be it known that I, BENJAMIN DOUGLAS THOMAS, a subject of the King of Great Britain, residing at Ithaca, in the county of Tompkins and State of New York, have invented new and useful Improvements in Engine Mountings for Airplanes, of which the following is a specification.

This invention relates to the construction of airplanes, and has for its object to provide an improved demountable engine mounting suitably attached to the frame or ribs of the fuselage and supporting the engine base. The engine mounting may also furnish a support for a casing above the fuselage, or in the wing section, to serve as a gasolene tank or as a radiator for the cooling water of the engine.

The present application is a division of my application Serial No. 623,612, filed March 8, 1923, and the invention is herein shown and described as applied in connection with a fuselage constructed in accordance with said parent application.

In the accompanying drawing,

Figure 1 is a perspective view of the front portion of the fuselage including the engine mounting;

Figure 2 is a side view of one of the bearers of the mounting;

Figure 3 an end view of the same;

Figures 4 and 5 a side and end view, respectively, of a detail connection, and

Figure 6 a detail section of another connection.

The fuselage comprises circular, or oval, tubular metal ribs 15, which, in the engine or front portion of the fuselage, are tied together by longitudinal and diagonal braces 16 and 17, welded or riveted to the ribs and forming a truss. The engine bearers, of which there are two, consist of a horizontal longitudinal bed member, 18, having arms, or struts 19, and diagonal braces, 20, welded thereto. The members of the engine bearer are preferably formed of tubular metal with the arms, 19, extending substantially at right angles to the longitudinal member, 18, and provided with split clamping members, 21, at their ends, for embracing the ribs, 15, and being securely fastened thereto. The clamping members may be formed in two semi-circular halves, adapted to fit over the tubular ribs, 15, and be secured together by bolts, as shown in Figs. 4 and 5.

The horizontal members 18, of the engine bearers are designed to directly support the engine by being bolted to the feet, 22, of the engine base at several points indicated in Fig. 2, and for this purpose, the tubular member, 18, is slotted at 24, and bent up to form a horizontal flange at these points where the bolts, 23, are located, as shown in Figs. 2 and 6. This allows access to the heads or nuts of the bolts, 23, within the tubular member, 18, as indicated, and permits of readily tightening or loosening the bolts. A projection or pin, 27, may be formed or secured on the upper half of the clamp, 21, for engaging a hole in the tubular rib, 15, in order to facilitate fastening the clamp, and to prevent the same from slipping upon the rib.

By means of this construction, the engine bearer may be readily dismounted or remounted upon the nose portion of the fuselage, thus permitting the interchangeability of engines by substituting for one engine with its engine bearer another engine and its bearer.

Another advantage is that it provides a shock absorbing connection between the engine bearer clamps and the nose portion of the fuselage for taking up vibration.

Means may also be provided for supporting the engine bearer and the weight of the engine directly from the wing structure, as by the strut members, 25, connected to the longitudinal bed members, 18, of the engine bearer at their lower ends, and at their upper ends to a portion of the wing structure, such as the tank, 26, where the wing structure includes a tank, such as is often customary. The tank may serve as a gasolene supply or as a radiator for the engine.

It will, therefore, be seen that this combination of demountable engine bearer to take engines of substantially similar weight including the gasolene tank or radiator, permits the use of a variety of engines without materially affecting the balance of the airplane. It also provides for removing a given engine with the fuel system and substituting another engine, or different type engine on its respective engine bearer together with fuel system.

Having now described my invention, what I claim as new and desire to secure by Letters Patent is:

1. In airplane construction, the combination with the frame of the fuselage, of a demountable engine bearer comprising a longitudinal metal tube adapted to be bolted to the engine base and having openings in said tube opposite said bolts for affording access to the same, and arms attached to said tube and provided with detachable clamps secured to the frame of the fuselage.

2. In airplane construction, the combination with the tubular ribs of the fuselage, of a demountable engine mounting, comprising two parallel horizontal tubular members, diagonal braces extending therefrom, and split clamps on the ends of said braces adapted to detachably engage said ribs.

3. In airplane construction, the combination with the tubular ribs of the fuselage, of a demountable engine mounting, comprising two parallel horizontal tubular members, diagonal braces extending therefrom, split clamps on the ends of said braces adapted to detachably engage said ribs, and struts connecting said members with the wing structure.

4. In airplane construction, the combination with the tubular ribs of the fuselage and the wing structure carrying a tank, of a demountable engine mounting comprising tubular horizontal members, means to detachably connect said members to said ribs, and struts connecting said members with said tank.

In testimony whereof I have hereunto set my hand.

BENJAMIN DOUGLAS THOMAS.

Having now described my invention, what I claim as new and desire to secure by Letters Patent is:

1. In airplane construction, the combination with the frame of the fuselage, of a demountable engine bearer comprising a longitudinal metal tube adapted to be bolted to the engine base and having openings in said tube opposite said bolts for affording access to the same, and arms attached to said tube and provided with detachable clamps secured to the frame of the fuselage.

2. In airplane construction, the combination with the tubular ribs of the fuselage, of a demountable engine mounting, comprising two parallel horizontal tubular members, diagonal braces extending therefrom, and split clamps on the ends of said braces adapted to detachably engage said ribs.

3. In airplane construction, the combination with the tubular ribs of the fuselage, of a demountable engine mounting, comprising two parallel horizontal tubular members, diagonal braces extending therefrom, split clamps on the ends of said braces adapted to detachably engage said ribs, and struts connecting said members with the wing structure.

4. In airplane construction, the combination with the tubular ribs of the fuselage and the wing structure carrying a tank, of a demountable engine mounting comprising tubular horizontal members, means to detachably connect said members to said ribs, and struts connecting said members with said tank.

In testimony whereof I have hereunto set my hand.

BENJAMIN DOUGLAS THOMAS.

Certificate of Correction.

It is hereby certified that Letters Patent No. 1,544,358, granted June 30, 1925, upon the application of Benjamin Douglas Thomas, of Ithaca, New York, for an improvement in "Engine Mountings for Airplanes," were erroneously issued to the inventor and "Thomas-Morse Aircraft Corporation, of Ithaca, New York, a corporation of New York," as assignee of one-half interest in said invention, whereas said corporation should have appeared as owner of *one-tenth* interest only, as shown by the records of assignments in this office; and that the said Letters Patent should be read with this correction therein that the same may conform to the record of the case in the Patent Office.

Signed and sealed this 13th day of October, A. D. 1925.

[SEAL.]
KARL FENNING,
*Acting Commissioner of Patents.*

Certificate of Correction.

It is hereby certified that Letters Patent No. 1,544,358, granted June 30, 1925, upon the application of Benjamin Douglas Thomas, of Ithaca, New York, for an improvement in " Engine Mountings for Airplanes," were erroneously issued to the inventor and " Thomas-Morse Aircraft Corporation, of Ithaca, New York, a corporation of New York," as assignee of one-half interest in said invention, whereas said corporation should have appeared as owner of *one-tenth* interest only, as shown by the records of assignments in this office; and that the said Letters Patent should be read with this correction therein that the same may conform to the record of the case in the Patent Office.

Signed and sealed this 13th day of October, A. D. 1925.

[SEAL.]

KARL FENNING,
*Acting Commissioner of Patents.*